United States Patent [19]

Tanaka

[11] Patent Number: 5,289,469
[45] Date of Patent: Feb. 22, 1994

[54] COMMUNICATION CONTROL UNIT WITH LOWER LAYER PROTOCOL CONTROL AND HIGHER LAYER PROTOCOL CONTROL

[75] Inventor: Koichi Tanaka, Kawasaki, Japan

[73] Assignee: Kabushiki Kaisha Toshiba, Kawasaki, Japan

[21] Appl. No.: 821,045

[22] Filed: Jan. 16, 1992

[30] Foreign Application Priority Data

Jan. 17, 1991 [JP] Japan .................. 3-004001

[51] Int. Cl.$^5$ .................................. H04J 3/24
[52] U.S. Cl. ........................ 370/94.1; 370/85.4; 370/85.6
[58] Field of Search ........... 370/94.1, 94.2, 60, 370/60.1, 79, 102, 110.1, 85.1, 85.2, 85.6, 85.13, 85.4, 85.5

[56] References Cited

U.S. PATENT DOCUMENTS

| | | | |
|---|---|---|---|
| 4,590,468 | 5/1986 | Stieglitz | 340/825.5 |
| 4,744,078 | 5/1988 | Kowalczyk | 370/85 |
| 4,930,121 | 5/1990 | Shiobara | 370/85.4 |
| 4,979,167 | 12/1990 | McCool | 370/85.4 |
| 4,998,246 | 3/1991 | Tanaka | 370/85.5 |
| 5,058,110 | 10/1991 | Beach et al. | 370/85.6 |
| 5,130,981 | 7/1992 | Murphy | 370/85.6 |

OTHER PUBLICATIONS

K. Tanaka et al., "VLSI Architecture for IEEE802.5 Token-Ring Lan Controller", IEEE 1989 Customintegrated Circuits Conference, May 15-18, 1989, pp. 15.2.1-15.2.5.

Primary Examiner—Douglas W. Olms
Assistant Examiner—Chau T. Nguyen
Attorney, Agent, or Firm—Foley & Lardner

[57] ABSTRACT

In the communication control unit lower layers communication control device includes first and second buffers. When MAC frames are received, these are input to the first buffer. By contrast, when LLC frames are received, these are first input to the second buffer, and then, transfered into a shared memory through output means. The second buffer operates as a ring buffer scheme and LLC frames can be received without missing any one after another in this unit, as long as the second buffer has enough capacity. Furthermore, only LLC frames are stored in the second buffer, thus enabling simplification of buffer management.

11 Claims, 4 Drawing Sheets

FIG. 3a
ISO OSI 7 LAYER MODEL
FIG. 3b
IEEE MODEL
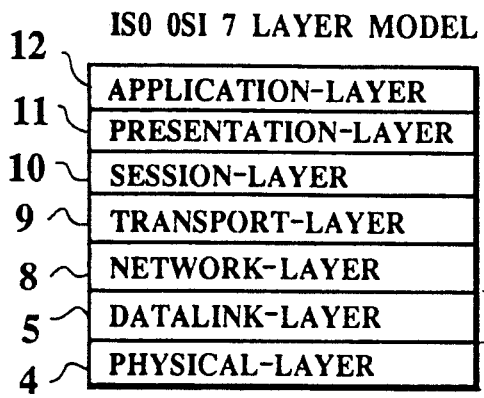
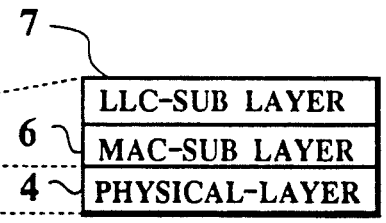
FIG. 4a
DATA STRUCTURE OF AN FB
FIG. 4b
DATA STRUCTURE OF AN FD
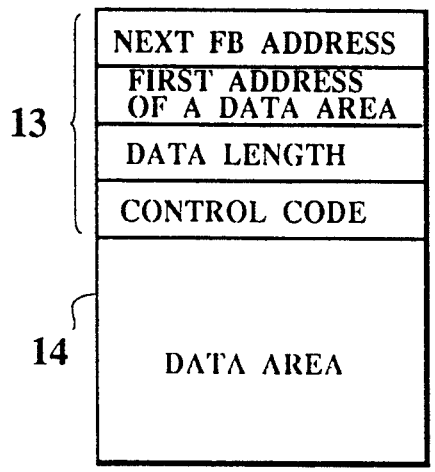
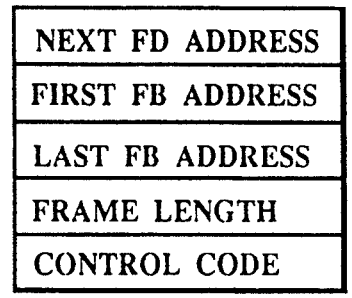
FIG. 4c
AN EXAMPLE IN WHICH ONE FRAME IS STORED INTO FB AND FD
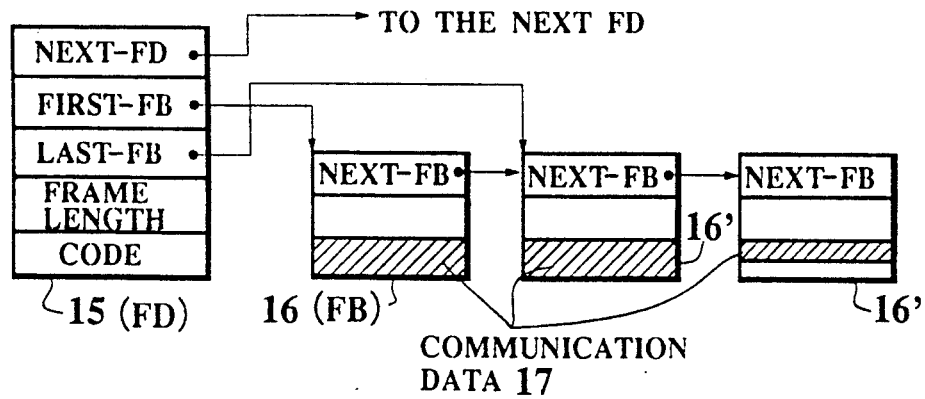

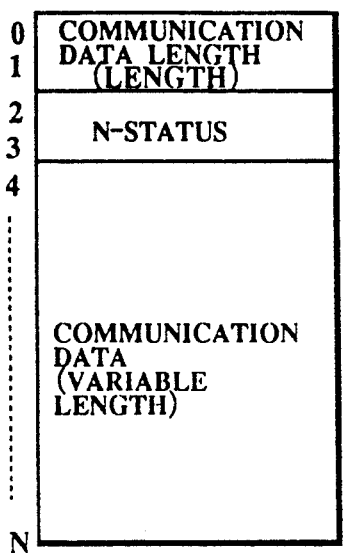
FIG. 5a
N-ADR 153 SET STRUCTURE
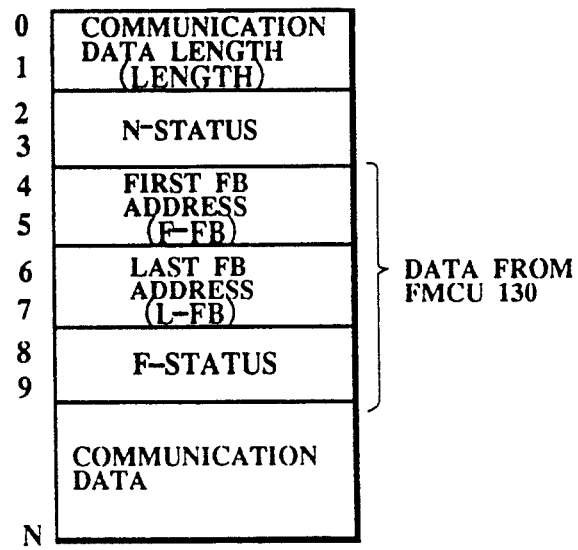
FIG. 5b
F-ADR 154 SET STRUCTURE
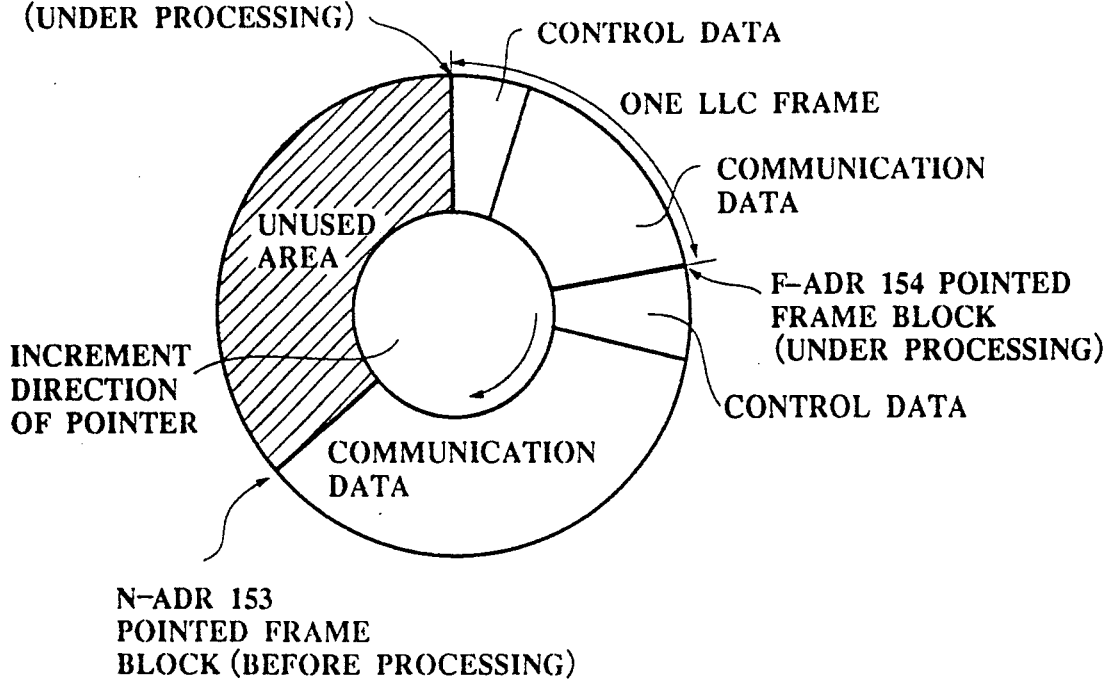
FIG. 5c  RING BUFFER STRUCTURE

COMMUNICATION CONTROL UNIT WITH LOWER LAYER PROTOCOL CONTROL AND HIGHER LAYER PROTOCOL CONTROL

BACKGROUND OF THE INVENTION

1. Field of the Invention

This invention relates to a communication control unit for a local area network. More particularly, it relates to a communication control unit which has a first and a second communication control means in order to execute higher and lower protocol layers separately.

2. Description of the Prior Art

Recently, communication control units, which are used in local area networks, have been decreased in size using the LSI technique. As the control of a MAC (Medium Access Control) layer has been carried out using LSIs, communication control units have become widely used, especially in the token ring system and the token bus system specified by IEEE standards.

As a result, a communication control unit in which MAC sublayer data and LLC (Logical link control) sublayer data are separately buffered, has been developed. MAC sublayer data (referred to as a MAC frame, below) should be processed inside the communication control unit which is made of LSIs, while LLC sublayer data (referred to as a LLC frame, below) should be processed in a higher layers control unit.

For example, in our report VLSI architecture for an IEEE 802.5 token-ring LAN controller", Tanaka et al., Custom Integrated Circuit Conference, 1989, a token-ring LAN control unit (TRC) which has two 128 byte FIFOs as buffers only for LLC frames and three FIFOs (two of which have 128 bytes and another has 40 bytes) as buffers only for MAC frames, is reported. Thus, the communication control unit is workable only for the MAC layer process because of the separation of buffers as described in this report.

On the other hand, in order to process communication data easier in a higher layers control unit, LLC frames should not be stored in a continuous memory area, but should be stored in divided memory areas (frame buffer areas, or FBs), each of which is comprised of tens to thousands of bytes. (This data structure is shown in FIG. 4 and the detail will be described in the explanation of embodiments.) Thus, if one unit is comprised of 128 bytes, an LLC frame having 10 K bytes is stored dividedly in 80 FBs. In order to gather up the data which are distributed into a plurality of FBs as mentioned above, a new data structure called the frame discriptor (FD) is used. This FD contains the whole length of an LLC frame, an FB address in which the beginning of the LLC frame is stored, their statuses, and so on. As a result, the communication control unit should not handle only the read-out of received data. The real operation of this LLC frame is as follows.

In a communication control unit, an FB list and an FD list are provided in advance to be used for receiving. When an LLC frame is received, DMA device begins to work under the control of a CPU which is incorporated in this control unit, so as to break up the LLC frame into a buffer size when it is transferred into buffers registered in the FB list. CPU sets an FD with the frame length, the FB address, and the status at the receiving end, and informs the higher layers control unit of these data through interrupt signals. In the case where a MAC frame is received, CPU descriminates the frame type. In other words, if the frame is found to be one which should be transferred to the higher layers control unit, it is processed in the same way as an LLC frame. Also, if the frame is found to be one which should be processed inside the unit, it is not written into memories.

According to the above mentioned structure of the prior art communication control unit, information regarding not only communication data but also various control data should be stored into memories. However, a usual DMA device cannot carry out such processes. So, those processes must be carried out in the CPU. Also, the final judgement regarding which frame must be stored into memories, should be carried out in the CPU. In the past, communication speeds were slow, so that the process time in the CPU did not have problems, because the time interval of receiving frames was relatively long. Recently, however, communication speeds have become faster and a large number of frames are received one after another. So, a reatively large time lag has arisen in the CPU process. According to this time lag, the activation of the DMA and the assignment of buffers occurs late. As a result, frames sometimes could not be received correctly by the communication control unit. In a TRC, for example, usually two FIFOs are provided for LLC frames. In this device, when a first frame has been received completely, the data are stored into the first FIFO. If a second frame is received during the output of the data from the first FIFO into memories, the data from the second frame are stored in the second FIFO. After the output from the first FIFO has been completed, the contents of the second FIFO is output. Thus, the continuous receiving of frames can be carried out in the TRC, using the two FIFOs alternatively. In this case, however, if the output from the second FIFO is late for the completion time of output from the first FIFO, the second FIFO overflows the data to cause a reception failure. Also, if the releasing of data from the first FIFO and the preparation for receiving the third frame are late, this third frame cannot be received at all by the first FIFO. Especially, in the case where short frames are received continuously, the handling interval requires a time shorter than the processing time, thus frequently causing receiving failures. In order to cope with this problem, increasing the number of FIFOs can be considered. It is, however, not a good solution because the increase of FIFOs requires the control circuit to become complicated and increase in size.

SUMMARY OF THE INVENTION

This invention has been made to overcome the above mentioned problems. Therefore, the object of this invention is to provide a communication control unit which is able to receive, especially short frames, continuously, by adding a simple control function and without increasing the number of FIFOs.

In one aspect of this invention, there is provided a communication control unit having first communication control means to execute lower layer protocols, second communication control means to execute higher layer protocols, and a shared memory to transfer data between first and second communication control means. The first communication control means is further comprised of: network control means having a judging part in which the beginning and the end of frames are recognized from serial data received from a network, and a recognition part in which frame types are judged; first buffer means to buffer MAC frames; second buffer means to buffer LLC frames; data output means to read out frames stored in the second buffer means and write them into the shared memory; and control means to supervise all means as a whole.

According to an aspect of this invention, LLC frames input through the network control means are stored first in the second buffer means without being processed by the control means. And then, these frames are transferred to the shared memory by the output means. Therefore, by providing enough capacity for the second buffer means, frames should be received without fail. Also, MAC frames, which are required for the protocol processing by the control means, are distributed to be received among the first buffer means. Therefore, only frames which should be output to the shared memory are stored in the second buffer means, thus enabling simplification of the buffer management.

These and other objects, features, and advantages of the present invention will be more apparent from the following description of preferred embodiments, taken in conjunction with the accompanying drawings.

BRIEF DESCRIPTION OF THE DRAWINGS

FIG. 3 shows the protocol hierarchy of communications;

FIGS. 4a, 4b, and 4c show the structures of data which are stored in a shared memory; and FIGS. 5a, 5b, and 5c show structures of data which are stored in the ring buffer shown in FIG. 2.

DETAILED DESCRIPTION OF PREFERRED EMBODIMENTS

Figure 1:
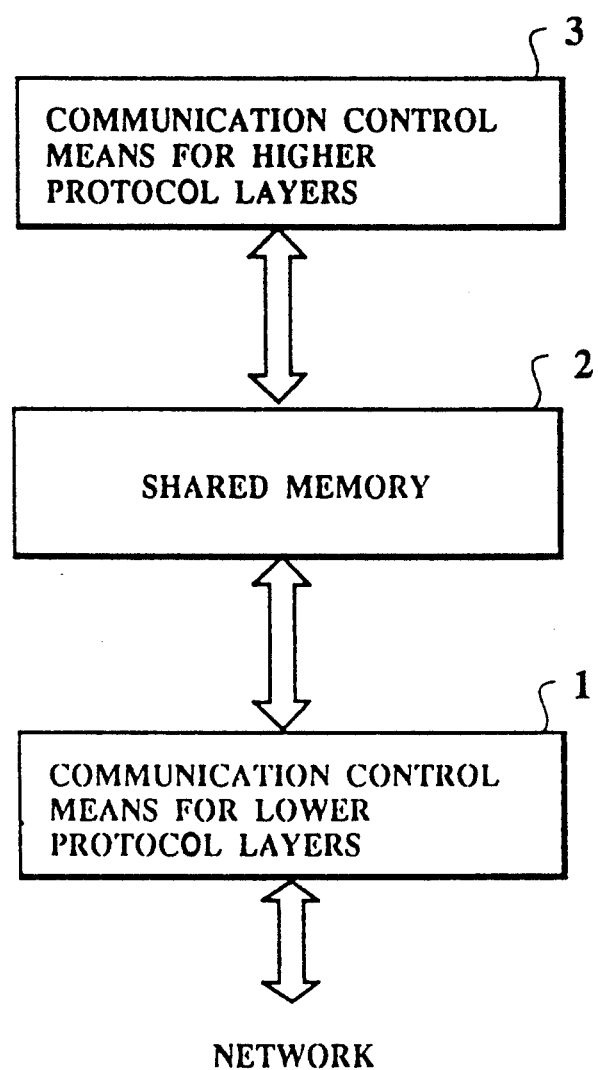
FIG. 1 is a block diagram showing the communication control unit according to one embodiment of this invention.

FIG. 1 shows the overall structure of a communication control unit according to the present invention. In order to control a communication protocol, this communication control unit is comprised of the following: lower layers communication control means 1 to control mainly the communication media; higher layers communication control means 3 to process a higher protocol layers than those processed by communication control means 1; and a shared memory 2 to transfer communication data between said means 1 and 2. The communication control unit according to this invention is characterized mainly by the structure of communication control means 1.

From ISO standards, it is fixed that the communication protocol has 7 protocol layers as shown in the left side of FIG. 3. On the other hand, from IEEE standards, the second layer, i.e., data link layer 5, is divided into two sub-layers, i.e., MAC (medium access control) sublayer 6 and LLC (logical link control) sublayer 7. As described below, in one embodiment of the present invention, the lower layers communication control means handles MAC sublayer 6 and physical layer 4, while the higher layers communication control means handles LLC sublayer 7 or above (i.e., the third layer 8, the fourth layer 9, fifth layer 10, sixth layer 11, and seventh layer 12).

Accordingly, the communication data, which are used to control MAC sublayer 6, are processed inside the lower layers communication control means, and so, those are covered up and cannot be seen by the higher communication control means. On the other hand, all the communication data, which are used in the third layer 8 or above, are treated as I (Information) frames in LLC sublayer 7. Therefore, MAC sublayer 6 is not concerned with the communication data belonging to LLC sublayer 7. In other words, the lower communication control means can recognize only the existence of LLC sublayer 7. In the lower layers communication control means, headers and trailers which are needed in MAC sublayer 6 are added into the communication data which are input from LLC sublayer 7. These are then output to the network. Also, the data, which are input from the network, are sent to LLC sublayer 7 by removing headers and trailers attached to MAC sublayer 6.

Figure 2:
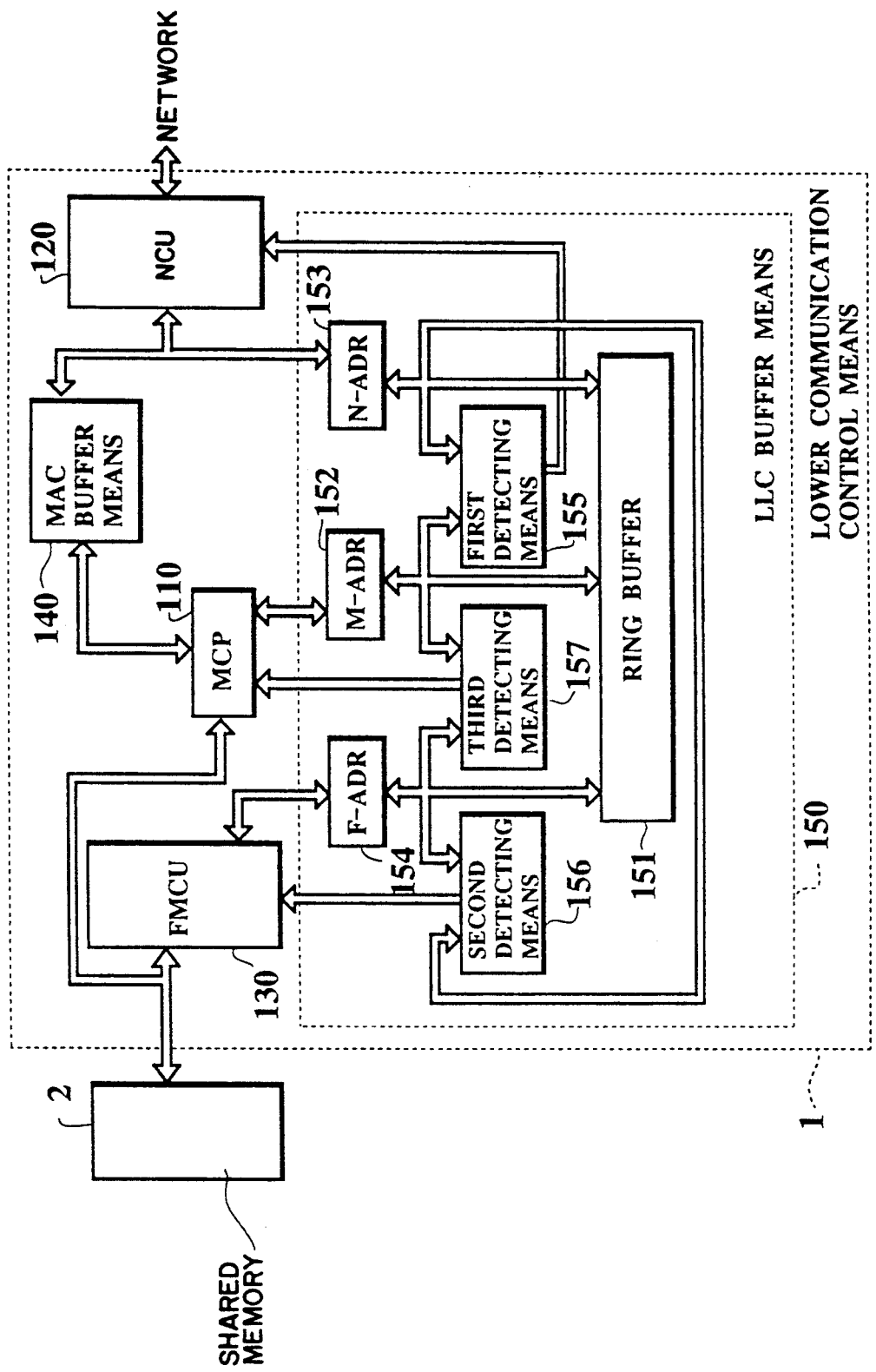
FIG. 2 is a block diagram showing the detail of the lower communication control means shown in FIG. 1.

FIG. 2 is a block diagram showing in detail the lower communication control means 1 according to one embodiment of this invention. In actuality, there exists bidirectional data flows between the higher and the lower communication means. The mechanism of the data flow from means 1 to the network is, however, not shown in this figure because this invention is characterized by the mechanism of receiving data from the network.

Shared memory 2 shown in FIG. 2 corresponds to shared memory 2 shown in FIG. 1. This memory is structured as shown in FIG. 4 so as to exchange data smoothly with the higher layers communication control means. As shown in FIG. 4a, an FB (frame buffer), which is the basic unit of data structure, has a management data area 13 and a data area 14 to construct one unit. Stored in management data area 13 are the addresses to indicate the next FB link, the addresses and the size of the data area, and the code which shows the end of a list. Data area 14 stores LLC frame data itself. In order to specify the FB list in which an LLC frame is stored, an FD (frame descriptor), which is the basic unit of frame structure, contains the addresses of the first and the last FBs on this list, the length of a frame, the receiving status, the addresses to indicate the next FD link, and the codes to indicate the end of the list, as shown in FIG. 4b. The FD and the FB lists are generated in advance by the higher layers communication control means, and these are provided to the lower layers communication control means. As shown in FIG. 4c, when the data area of one FB 16 is smaller than the data amount of an LLC frame, the data stored in FD 15 are distributed for storage among a plurality of FBs 16, 16', and 16". In FIG. 4c, the shadow areas 17, 17 . . . show the amount of communication data stored in each data area.

Next, lower layers communication control means 1 will be explained by referring to FIG. 2.

A master control processor (referred to as MCP, below) 110 supervises all the other means which are contained in lower layers communication control means 1. This processor 110 also executes a protocol process for MAC layers. Thus, this is comprised of a CPU and its programs.

A Network control unit (referred to as NCU, below) 120 has the following functions: provides an electrical connection with communication media; parallel/serial conversion of data; discrimination of frames; and generation and testing of frame check sequence (FCS) for error detection. This unit also generates status information when receiving is over.

Data output means (referred to as FMCU, i.e., frame memory control unit) 130 writes the communication data (referred as LLC frame, below), which belong to the LLC layer and are received from the network, into shared memory 2. Following the FB list, this FMCU 130 also divides an LLC frame into the size of a data area, and stores data into data areas.

MAC buffer means (referred to as MAC buffer, below) 140 is a memory in which the communication data recognized as MAC frames in NCU 120 should be stored.

LLC buffer means (referred to as LLC buffer, below) 150 is a memory in which the communication data recognized in NCU 120 as LLC frames should be stored. This LLC buffer contains the following: a memory 151 which is used as a ring buffer; three kinds of address means 152, 153, and 154, which indicate the addresses of memory 151; and three kinds of detecting means 155, 156, and 157, which detect the full/empty conditions of ring buffer 151.

These structures contained in LLC buffer 150 will be explained next. Ring buffer 151 is a memory which is accessed by byte units. This buffer is also managed by frame blocks which have the data structure shown in FIGS. 5a-5c, in order to store a plurality of LLC frames. As shown in FIG. 5a, the frame block after being received by NCU 120, is comprised of 'Length', which shows the length of an LLC frame, 'N-Status', which shows the end of receiving, and LLC frame data. Usually, the length of an LLC frame is less than 64K byte. Therefore, 2 bytes are assigned to 'Length'. Also, 2 bytes are assigned to 'N-Status' for ease of handling. As a result, one frame block is stored into ring buffer 151 as shown in FIG. 5c, having additional information, i.e., length of an LLC frame+4 bytes. When frames are received one after another, the address of the next frame is given by the following equation: (address of the present frame block+Length+4). Therefore, many LLC frames can be stored as long as the ring buffer doesn't overflow. FIG. 4c shows the situation in which the two LLC frames shown in FIGS. 4a and 4b are stored in ring buffer 151, while some unused area still remains there. Once the LLC frames are read out by FMCU 130 and written into FBs, in addition to 'Length' and 'N-Status' the following is still remaining as shown in FIG. 5b: the front (F-FB) and the end (L-FB) FB addresses of the FB list in which the LLC frame output by FMCU 130 was being stored and the operation end status of FMCU 130 (F-Status). However, once the LLC frame has been stored into FBs, the data contained in ring buffer 151 become unnecessary. Then, it is possible to overwrite on the LLC frame data. Ring buffer 151, thus, needs no extra area. The frame block addresses, which FMCU 130 should read out and write into FBs next, can also be obtained from the above equation.

First address means 152 (referred to as M-ADR, below) retains addresses (M-FBA) of frame blocks under operation by MCP 110. Means 152 also has the following functions: to find the real addresses of ring buffer 151 from the values, i.e., addresses of the control data, such as 'Length', which are given by said MCP 11 as off-sets inside the frame block; and to find the address of the next frame block according to the instruction by MCP 110. When MCP 110 gives an instruction for initialization, M-FBA is set to the reset address.

Second address means 153 (referred to as N-ADR, below) retains the following: address (N-FBA) of a frame block which is to store LLC frames received by NCU 120; address (N-FDA) in which LLC frame data are written; and a counter to measure frame lengths. When MCP 110 gives an instruction for initialization, means 153 operates to set N-FBA to a reset address, and to find addresses, in which data should be written, from the equation, (N-FDA)=(N-FBA)+4. Then, the counter is set to 0. NCU 120 first provides the start of LLC frame receiving, and then sends LLC frames one after another into LLC buffer 150. These data are written into the appropriate addresses as instructed by this N-FDA, and, at the same time, N-FDA and the counter are incremented together. NCU 120 sends a receiving end status into means 153 at the end of LLC frame receiving. Means 153 writes status into '(N-FBA)+2' address as 'N-Status', and the counter value into '(N-FBA)+0' address as 'Length', respectively. Also, from the following equations, an address, in which the next LLC frame should be stored, is found, and then, the counter is set to 0:

$$(N\text{-}FBA)=(N\text{-}FDA)$$

$$(N\text{-}FDA)=(N\text{-}FBA)+4.$$

Third address means 154 (F-ADR) contains the following: frame block address (F-FBA) of an LLC frame which is to be written into shared memory 2 by FMCU 130; addresses which are used to read out LLC frame data; and a counter to count the amount of read out data. When MCP 110 gives an instruction for initialization, this third address means 154 sets the frame data address to the reset address, and finds the address from which data are read out, according to the following equation:

$$(F\text{-}FDA)=(F\text{-}FBA)+4.$$

This third address means 154 is also activated by a read out instruction from FMCU 130, and then in turn, it reads out the data stored in the addresses which are pointed out by F-FDA. The read out result is then output to FMCU 130. After this, F-FDA will be incremented. Once the writing to shared memory 2 by FMCU 130 has been completed, F-FB, L-FB, and an operation end status are sent from means 130. Thus, these are written respectively into predetermined positions which are derived from a standard address, i.e., F-FBA. After this, in order to read out the next frame, the address of the next frame block will be found according to the following equations:

$$(f\text{-}FBA)=(F\text{-}FBA)+\text{Length}+4,$$

and $$(F\text{-}FDA)=(F\text{-}FBA)+4.$$

First detecting means 155 finds the remaining amount of buffers between M-ADR 152 and N-ADR 153. This means 155 is, therefore, for detecting that there is no room remaining, i.e., Full, in ring buffer 151. This 'Full' is detected when frame data address (N-FBA) of N-ADR 153 is about to pass frame block address (M-FBA) of M-ADR 152, and indicates to NCU 120 that the present frame being received could not be written correctly.

Second detecting means 156 finds the remaining amount of buffers between N-ADR 153 and F-ADR 154. In other words, means 156 is to find that there is no LLC frame to be written into shared memory 2, in ring buffer 151, i.e., (FMCU-Empty). Means 156 is also for detecting the read out end (DATA-End) of an LLC frame which is under output by FMCU 130, and to find there is no data to be read out by means 130, i.e., (DATA-Empty), while FMCU 130 reads out LLC frames which are being received by NCU 120. This information detected by means 156 is then provided to FMCU 130 respectively.

Third detecting means 157 finds the remaining amount of buffers between M-ADR 152 and F-ADR 154. In other words, means 157 is for detecting that there is no LLC frame, i.e., (MCP-Empty), which should be processed in MCP 110. MCP-Empty is found when M-FBA is equal to F-FBA, and this is indicated to MCP 110. By contrast, if MCP-Empty is not detected, there may be some LLC frames existing which are to be written into shared memory 2 through FMCU 130, and these frames should be processed in MCP 110.

The communication control unit according to one embodiment of this invention is constructed as mentioned above, and the operation will be explained next.

Initialization stage

Higher layers communication control means 3 makes an FD list and an FB list in shared memory 2 in order to receive LLC frames. Then, means 3 informs lower layers communication control means 1 of these lists, and also indicates the beginning of communication.

First, as soon as lower layers communication control means 1 is informed of the beginning of communication, MCP 110 is activated. MCP 110 gives an instruction to initialize ring buffer 151, thus resulting in the reset of first, second, and third address means 152, 153, and 154 (M-ADR, N-ADR, and F-ADR). As a result, the remaining buffer signals, i.e., Full=0 from first detecting means 155, FMCU-Empty=1 from second detecting means 156, and MCP-Empty=1 from third detecting means 157, are output. MCP 110 informs FMCU 130 of the first address of the FB list and gives an instruction to start an operation. At the same time, MCP 110 also gives an instruction to start an operation for NCU 120.

MAC frame receiving

When NCU 120 recognizes that the frame received from the network is a MAC frame, MAC buffer means 140 is informed of the start of receiving, and received data are introduced into means 140. At the receiving end, a receiving end status is sent into means 140 in the same way as that of the receiving start. Signals to start or to finish receiving are introduced into MCP 110 form NCU 120, and then, MCP 110 executes a MAC protocol process according to the frame stored in MAC buffer means 140.

Single LLC frame receiving

When NCU 120 recognizes that the frame received from the network is an LLC frame, LLC buffer means 150 is informed of the receiving start, and received data are provided to means 150. Inside LLC buffer 150, N-ADR 153 stores data into the N-FDA address. Once this receiving has started, FMCU-Empty becomes '0' in second detecting means 156 so as to indicate that there is some data remaining in FMCU 130, which should be written into shared memory 2. Right after this, FMCU 130 gives an instruction to start operation against F-ADR 154, in order to start data reading. MCP 110 is also informed of the start of receiving, and begins to operate.

As FMCU 130 begins to operate, the data stored in ring buffer 151 are reduced. When all the data have been taken out, 'DATA-Empty' in second detecting means 156 becomes 1 (DATA-Empty=1). Thus, FMCU 130 waits until DATA-Empty becomes '0', i.e., data are stored in buffer 151. When DATA-Empty becomes '0', FMCU 130 begins to transfer data again.

When receiving has been completed, and as a receiving end status is sent, N-ADR 153 writes this status with 'Length' into a predetermined address and updates N-FBA and N-FDA addresses. FMCU 130 keeps operating until the DATA-End signal, showing that there is no LLC frame data, is output from second detecting means 156. FMCU 130 sends an operation end status and so on into F-ADR 154 when operation has been completed. F-ADR 154 writes them into the predetermined addresses and updates F-FBA and F-FDA addresses. As a result, the values of address M-FBA in M-ADR 152 and address F-FBA in F-ADR 154 become different from each other, thus causing MCP-Empty to be 0 in third detecting means 157. This situation indicates to MCP 110 that the receiving operation by FMCU 130 has finished. Therefore, MCP 110 reads out the management information, such as 'Length', 'First-FB' and so on from the place where M-ADR 152 points out, and transfers them into the FD list to inform higher layer communication control unit 3 of the generation of LLC frame communication. MCP 110 gives the instruction for address M-FBA in M-ADR 152 to update the address into the next one.

In the case where a single LLC frame is received, three addresses M-FBA, N-FBA, and F-FBA in the respective address means (ADR) 152, 153, and 154 indicate the same frame block. This situation is equivalent to the initial state.

Continuous LLC frame receiving

In the case where some LLC frames are received one after another from the network, the start of receiving for the first LLC frame is provided to LLC buffer means 150 as mentioned above, and received data are introduced into means 150. In LLC buffer means 150, N-ADR 153 stores the data into N-FDA address. At the same time, in second detecting means 156, FMCU-Empty becomes '0' to indicate there are some data in FMCU 130, the data which should be written into shared memory 2, by FMCU 130. After the end of receiving, a receiving end status is introduced. Thus, N-ADR 153 writes this status with 'Length' into a predetermined address, and updates addresses N-FBA and N-FDA. When the next LLC frame is received, NCU 120 and N-ADR 153 repeat the above mentioned procedure to write LLC frames into ring buffer 151 one after another.

Having received FMCU-Empty=0 from means 156, FMCU 130 indicates the start of operation immediately for F-ADR 154, and begins to read out data. FMCU 130 keeps operating until a DATA-End signal, for the LLC frame being read, is delivered from means 156, and FMCU 130 then sends an operation end status, and so on, into F-ADR 154 when the operation is completed. F-ADR 154 writes this information into predetermined addresses, and updates addresses F-FBA and F-FDA. At this moment, the respective values of addresses M-FBA and F-FBA in M-ADR 152 become different, thus causing MCP-Empty be '0' in means 157. This situation shows that the completion of the receiving operation by FMCU 130 is provided to MCP 110.

When NCU 120 receives LLC frames one after another, there are some LLC frames existing in ring buffer 151. This situation is shown as FMCU-Empty=0 in second detecting means 156. Therefore, FMCU indicates the start of operation again for F-ADR 154, so as to read out LLC frames. This process is repeated until the frame block, which is controlled by F-ADR 154, catches up with the other frame block, which is indicated by N-ADR 153. When the former has caught up with the latter, and in the case where NUC 120 is not receiving an LLC frame, FMCU-Empty becomes '1' in means 156, and FMCU 130 will stop operating.

MCP 110 is informed of the start of LLC frame receiving from NCU 120, and begins the receiving operation. When FMCU 130 has completed one frame process, the respective values of addresses M-FBA in M-ADR 152 and F-FBA in F-ADR 154 become different from each other, so that MCP-Empty becomes '0' in means 156. This situation shows there is an LLC frame existing which should be processed completely by MCP 110. Having completed the process, MCP 110 gives an instruction for M-ADR 152 to update address M-FBA. Even in this situation, and when the respective values of addresses M-FBA in M-ADR 152 and F-FBA in F-ADR 154 still differ from each other, there are still some remaining LLC frames which have been processed by FMCU 130. Therefore, MCP-Empty remains as '0', and MCP 110 keeps operating so as to finish up the process. In the case where the respective values in addresses M-FBA and F-FBA become in equal, MCP-Empty becomes '1' in means 157. This situation means that FMCU 130 has not completed the process for the particular LLC frame, and therefore, MCP 110 cannot process it.

As described above, NCU 120 receives LLC frames automatically as long as there is room in ring buffer 151, and FMCU 130 writes the information concerned into shared memory 2 as long as there are some LLC frames stored in ring buffer 151. In parallel with these processings, MCP 110 informs higher layers communication control means 3 of the frames which have been processed completely by FMCU 130. When the process speeds of MCP 110, NCU 120, and FMCU 130 are in balance, ring buffer 151 can receive many frames one after another without overflowing. Furthermore, as MAC frames, which are required in order to process the MAC protocol, and as LLC frames, which are concerned with the higher protocol, are buffered separately in this unit, FMCU 130 can transfer data into shared memory 2 without giving any consideration to their frame types. At the same time, MCP 110 can execute MAC protocol process, so that the process efficiency in lower layers communication control means 1 increases as a whole.

In summary, as described above by referring to embodiments, buffering means are selected for use according to frame types in the communication control unit of this invention. Therefore, the data processing which is most suitable for a particular frame can be selected. Particularly, in the case where long and short LLC frames are mixed and received one after another, these frames can be received without missing any because of the existence of the second buffer means which stores LLC frames. On the other hand, MAC frames, which are required for the protocol control by the controlling means, are distributed to be received by the first means. Therefore, only frames which should be output to a shared memory are stored in the second buffer means, thus enabling the simplification of buffer management.

The physical data transfer within a network, the data transfer between lower and higher layers communication control means, and the protocol processing which should be carried out within lower layers communication control unit, are executed in parallel in this unit. So, the throughput of the lower layers communication control unit is improved, and also, the communication throughput of the whole system including higher layers communication control means is improved in the communication control unit according to the present invention.

What is claimed is:

1. A communication control unit comprising:
   first communication control means for executing lower layer protocols relating to layers no higher than a specific layer;
   second communication control means for executing higher layer protocols relating to layers higher than said specific layer; and
   a shared memory for transferring data between said first and second communication control means;
   said first communication control means comprising
      frame receiving means having a judging part in which a beginning and an end of a frame are recognized from serial data received through an input network, and a recognition part for determining whether said frame has to be transferred to said second communication control means,
      first buffer means for buffering first type frames which need not be treated by said second communication means,
      second buffer means for buffering second type frames which must be treated by said second communication means, said second buffer means comprising a ring buffer capable of storing a plurality of frames,
      data output means for reading out frames stored in said second buffer means and for writing said frames into said shared memory, and
      reporting means for reporting said frames in said shared memory to said second communication control means,
      said second buffer means judging whether or not a frame to be transferred to said second communication means is stored therein and activating said data output means to transfer said frames from said second buffer means to said shared memory.

2. The communication control unit as claimed in claim 1, wherein said first buffer means stores medium access control (MAC) frames.

3. The communication control unit as claimed in claim 1, wherein said second buffer means stores logical link control (LLC) frames.

4. The communication control unit as claimed in claim 1, wherein said second buffer means includes:
   means for storing frames and control information;
   first means for holding a first address for said frame receiving means to write said frame and control information attached thereto into said means for storing frames and control information;
   second means for holding a second address for said data output means to read out said frames from said storing means and write said control information into said means for storing frames and control information;

third means for holding a third address for said reporting means to read out said frames and said control information from said means for storing frames and control information;

means for detecting an overflow of said second buffer means from contents held in said first and third address holding means, and for informing said frame receiving means of said overflow;

means for detecting whether there is a stored frame in said second buffer means, from contents held in said first and second address holding means, and for informing said data output means of said stored frame; and means for detecting whether there is a frame, which should be processed by said reporting means in said second buffer means, from contents held in said second and third address holding means.

5. The communication control unit as claimed in claim 4, wherein said frame receiving means stores frames in said first buffer means if MAC frames, and stores frames in said second buffer means if LLC frames unless said overflow of said second buffer means is detected.

6. The communication control unit as claimed in claim 4, wherein said ring buffer continuously stores a plurality of blocks, each comprising communication data and control data contained in one input frame as one unit, and wherein said ring buffer overwrites next control data over said communication data when read out.

7. A communication control unit comprising:

first communication control means for executing lower protocol layers relating to layers no higher than a specific layer;

second communication control means for executing higher protocol layers relating to layers higher than said specific layer; and a shared memory for transferring data between said first and second communication control means;

said first communication control means comprising frame receiving means having a judging part in which the beginning and the end of frames are recognized from serial data received through an input network, and a recognition part for determining whether said frames are MAC frames or LLC frames, first buffer means for buffering said MAC frames, second buffer means for buffering said LLC frames, data output means for reading out said LLC frames stored in said second buffer means and for writing said LLC frames into said shared memory, reporting means for reporting said LLC frames to said second communication control means, a ring buffer for storing said LLC frames, first means for holding a first address for said frame receiving means to write said input LLC frames into said ring buffer, second means for holding a second address for said data output means to read out said input frames from said ring buffer;

third means for holding a third address for said reporting means to read out said input frames from said ring buffer as well as to write control information into said ring buffer, first means for detecting an overflow of said ring buffer from information stored in said first and third address holding means, and for informing said frame receiving means of said overflow, second means for detecting an LLC frame existing in said ring buffer from information stored in said first and second address holding means, and for providing a detection indication to said data output means, and third means for detecting an LLC frame remaining in said ring buffer which should be processed by said reporting means, from information stored in said second and third address holding means.

8. A communication control unit comprising:

first communication control means for executing lower layer protocols relating to layers no higher than a specific layer;

second communication control means for executing higher layer protocols relating to layers higher than said specific layer; and a shared memory for transferring data between said first and second communication control means;

said first communication control means comprising frame receiving means having a judging part in which a beginning and an end of a frame are recognized from serial data received through an input network and a recognition part for determining whether or not said frame has to be transferred to said second communication control means, reporting means for reporting said frame in said shared memory to said second communication control means, first buffer means for buffering first type frames which need not be treated by said second communication means, second buffer means for buffering second type frames which must be treated by said second communication means, said second buffer means comprising a ring buffer capable of storing a plurality of frames;

data output means for reading out frames stored in said second buffer means and for writing said frames into said shared memory, said second buffer means including means for storing frames and control information, first means for holding a first address for said frame receiving means to write frame and control information attached thereto into said means for storing frames and control information, second means for holding a second address for said data output means to read out said frames from said holding means and to write said control information into said means for storing input frames and control information, third means for holding a third address for said reporting means to read out said frames and said control information from said means for storing input frames and control information, means for detecting an overflow of said second buffer means from contents stored in said first and third address holding means, and for informing said frame receiving means of said overflow, means for detecting whether there is a stored frame in said second buffer means, from information stored in said first and second address holding means, and for informing said data output means of said stored frame, and means for detecting whether a frame, which should be processed by said reporting means, is in said second buffer means, from information stored in said second and third address holding means.

9. The communication control unit as claimed in claim 8, wherein said receiving means stores frames into said first buffer means, if MAC frames, and stores frames into said second buffer means, if LLC frames, unless said overflow of said second buffer means is detected.

10. The communication control unit as claimed in claim 8,
wherein said ring buffer continuously stores a plurality of blocks, each comprising communication data and control data contained in one input frame as one unit, and
wherein said ring buffer can overwrite next control data over said communication data when read out.

11. In a communication control unit comprising first communication control means connected to a network for receiving frames from said network and processing frames with respect to layers no higher than a specific layer, second communication means for processing frames with respect to layers higher than said specific layer and a shared memory through which said first and second communication control means exchange frames said first communication control means comprising:
a network control unit for receiving and processing frames to enable protocol execution thereof;
a master control processor operatively connected with said network control unit for receiving and processing a frame which does not need to be transferred to said second communication control means;
a frame memory control unit for accessing said accessing said shared memory to write frames in said shared memory;
first buffer means connected with said network control unit and said master control processor in order to temporary store a frame which does not need to be transferred to said second communication control means and to transfer said frame to said master control processor; and
second buffer means connected with said network control unit and said frame memory control unit to receive frames needing to be treated with respect to a layer higher than said specific layer from said network control unit, store said frames therein and transfer said frames to said frame memory control unit, said second buffer means having detection means for detecting whether said second buffer means is storing a frame to be transmitted to said frame memory control unit,
said master control processor being connected to said second buffer means for reporting a frame which needs to be transferred to said second communication control means,
said second buffer means activating said frame memory control unit, when said second buffer means is storing a frame, to transfer said frame from said second buffer means to said shared memory through said frame memory control unit.

* * * * *